(12) United States Patent
Buhrke (10) Patent No.: US 12,397,626 B2
(45) Date of Patent: Aug. 26, 2025

(54) DRIVETRAIN, AGRICULTURAL VEHICLE, AND METHOD FOR OPERATING A DRIVETRAIN

(71) Applicant: DEERE & COMPANY, Moline, IL (US)

(72) Inventor: Frank Buhrke, Birkenau (DE)

(73) Assignee: DEERE & COMPANY, Moline, IL (US)

(*) Notice: Subject to any disclaimer, the term of this patent is extended or adjusted under 35 U.S.C. 154(b) by 369 days.

(21) Appl. No.: 18/155,252

(22) Filed: Jan. 17, 2023

(65) Prior Publication Data

US 2023/0286365 A1   Sep. 14, 2023

(30) Foreign Application Priority Data

Mar. 8, 2022   (DE) .......................... 102022105401.2

(51) Int. Cl.
*B60K 1/02* (2006.01)
*B60K 17/28* (2006.01)
*B60K 17/356* (2006.01)

(52) U.S. Cl.
CPC ................ *B60K 1/02* (2013.01); *B60K 17/28* (2013.01); *B60K 17/356* (2013.01); *B60Y 2200/221* (2013.01)

(58) Field of Classification Search
CPC ........ B60K 1/02; B60K 17/28; B60K 17/356; B60Y 2200/221
See application file for complete search history.

(56) References Cited

U.S. PATENT DOCUMENTS

2015/0197239 A1   7/2015   Vilar et al.

FOREIGN PATENT DOCUMENTS

| DE | 202014000738 U1 | 3/2014 | |
| DE | 102017223158 A1 | 6/2019 | |
| DE | 102018206411 A1 * | 10/2019 | ............... B60K 1/00 |
| DE | 102023108463 A1 * | 10/2024 | |

* cited by examiner

*Primary Examiner* — Faye M Fleming (57) ABSTRACT

A drivetrain for an agricultural vehicle includes a rear axle, and a front axle, a first electric drive unit, and a transmission. The transmission has a first output shaft connected to the rear axle. The drivetrain includes a front axle drive unit having a second output shaft. The first output shaft is connected to the second output shaft. The first electric drive unit is connected to the second output shaft. A torque can be introduced into the second output shaft by the first electric drive unit. The torque can be transmitted from the second output shaft via the transmission to the rear axle such that the rear axle can be driven by the first electric drive unit.

20 Claims, 9 Drawing Sheets

DRIVETRAIN, AGRICULTURAL VEHICLE, AND METHOD FOR OPERATING A DRIVETRAIN

CROSS-REFERENCE TO RELATED APPLICATIONS

This application claims priority to German Patent Application No. 102022105401.2, filed Mar. 8, 2022, which is hereby incorporated by reference.

FIELD OF THE DISCLOSURE

The disclosure relates to a drivetrain for an agricultural vehicle, an agricultural vehicle including a drivetrain, and a method for operating a drivetrain for an agricultural vehicle.

BACKGROUND

Agricultural vehicles can have a drivetrain with an internal combustion engine, which drives the wheels of the agricultural vehicle via a transmission. The internal combustion engines are operated with a fuel which can be refilled, with primarily diesel-driven internal combustion engines being used.

SUMMARY

One potential disadvantage of internal combustion engines can be that the agricultural vehicles may potentially disseminate emissions and soot particles during working operations. These may potentially be absorbed, for example, by the people operating the agricultural vehicles and potentially may be deposited on the field and on the plants. Animal and human health may potentially be adversely affected and the environment potentially polluted as a result. In order to minimize the potential discharge of harmful substances and the potential production of noise, vehicles have been developed having a drivetrain with electric drive units. DE 20 2014 000 738 U1 includes a wheeled loader with an electric motor which drives an axle of the wheeled loader via a non-shiftable transmission. In view of this, the development of a cost-effective electric agricultural vehicle is desirable.

The present disclosure is therefore based on the object of proposing a drivetrain and an agricultural vehicle, and a method for operating a drivetrain, by means of which the aforementioned disadvantages are overcome. For example, a drivetrain, an agricultural vehicle, and a method are intended to be proposed, which are structurally simple and for example have a compact construction, and/or the internal combustion engine of which can simply be replaced by an electric drive unit and/or the operation of which can be implemented in terms of technical and/or economical aspects.

This object is achieved by a drivetrain disclosed herein, and by an agricultural vehicle disclosed herein, and by a method for operating a drivetrain disclosed herein. Additional advantages are disclosed in the following embodiments.

According to the disclosure, a drivetrain for an agricultural vehicle is proposed. The drivetrain comprises a rear axle and a front axle, and a first electric drive unit, and a transmission with a first output shaft. The first output shaft is connected, for example driveably connected and/or mechanically coupled, to the rear axle. The drivetrain furthermore comprises a front axle drive unit, which differs for example from the transmission. The front axle drive unit comprises a second output shaft. The first output shaft is connected, for example driveably connected and/or mechanically coupled, to the second output shaft. The first electric drive unit is also connected, for example driveably connected and/or mechanically coupled, to the second output shaft. A torque can be introduced into the second output shaft by the first electric drive unit and can be transmitted from the second output shaft by the transmission, for example via the first output shaft of the transmission, to the rear axle such that the rear axle can be driven from or by the first electric drive unit.

The drivetrain is used for driving a propulsion movement of the agricultural vehicle. The propulsion movement can be a forward and/or reversing movement. The agricultural vehicle can be a towing vehicle or a tractor, for example a construction machine. The agricultural vehicle can also be a driven trailer with its own drive.

Ground engagement means, for example wheels and/or tracks or chains, can be mounted on the front axle and/or on the rear axle. The first output shaft is connected, for example driveably connected and/or mechanically coupled, to the rear axle. As a result, the rear axle can be driveable via the first output shaft, i.e., for example a torque can be able to be introduced and/or transmitted from the first output shaft to the rear axle. Connected, for example driveably connected and/or mechanically coupled, can be understood below as meaning a connection, for example a driveable connection and/or a mechanical coupling, of two components of the drive train, which makes it possible to transmit a force or a moment, for example a torque, from the one component to the other mechanically. Between the two components, further components permitting such a transmission of force or moment, for example transmission of torque, between the two components can be provided here. The first output shaft or the first electric drive unit can for example also be connected, for example driveably connected and/or mechanically coupled, to the front axle.

The first electric drive unit can be a first electric motor which is suitable for example for driving a propulsion movement of the agricultural vehicle. The first electric drive unit, for example the first electric motor, can be connected, for example driveably connected and/or mechanically coupled, for example directly, to the second output shaft. However, the first electric drive unit may also have a shaft which is connected, for example driveably connected and/or mechanically coupled, to the second output shaft. In addition, the first output shaft is connected, for example driveably connected and/or mechanically coupled, to the second output shaft. As a result, the first output shaft can be driveable via the second output shaft by the first electric drive unit, i.e., for example a torque can be introducible and/or transmittable from the first electric drive unit via the second output shaft into and/or to the first output shaft and from the first output shaft into and/or to the rear axle. The first electric drive unit, for example the first electric motor, can be a synchronous and/or asynchronous motor and/or a reluctance motor and/or a DC motor. The front axle drive unit can also comprise a first coupling element, for example a multi-plate clutch or dog clutches, or can be in the form of a shift assembly or synchronizer comprising an actuating device, for example sliding sleeves, and a synchronizing ring. As a result, the front axle drive unit, for example the second output shaft, and therefore the first electric drive unit, can be shiftably connectable, for example shiftably and driveably connectable, and/or shiftably and mechanically coupleable, to the first output shaft. The front axle drive unit can be arranged directly on the transmission.

An energy storage unit can supply the first electric drive unit with electrical energy. The first electric drive unit can therefore be operated with electrical energy from the energy storage unit. The first electric drive unit serves for driving the traction drive of the agricultural vehicle. A propulsion movement of the agricultural vehicle (e.g., forward and reversing travel) is therefore operated by means of the electrical energy from the energy storage unit.

Alternatively, the front axle can also be connected, for example driveably connected and/or mechanically coupled, to the front axle drive unit, for example directly or indirectly to the second output shaft, or to the first electric drive unit, for example directly or indirectly to the first electric drive unit, for example to a fourth output shaft of the first electric drive unit. As a result, a rotational movement and/or a force and/or a torque can thereby be transmittable by the first electric drive unit to the rear axle and the front axle, and therefore the front axle and the rear axle are driveable by the first electric drive unit. The front axle can therefore be activatable on demand or permanently driven. The front axle and the rear axle convert a rotational movement and/or force and/or a torque of the first electric drive unit into a rotational movement and/or force and/or a torque of one or more ground engagement means, and thus into a propulsion of the vehicle. The drivetrain can also comprise a fourth electric drive unit. As a result, a rotational movement and/or a force and/or a torque can thereby be transmittable by the fourth electric drive unit to the front axle, and therefore the front axle is driveable by the fourth electric drive unit. The front axle can thereby be driveable by the fourth electric drive unit and the rear axle by the first electric drive unit.

The drive train can also comprise a reduction transmission with a reduction transmission drive and a reduction transmission output, wherein the reduction transmission drive can be connected, for example driveably connected and/or mechanically coupled, to the first electric drive unit, for example to a shaft of the first electric drive unit. The reduction transmission output can be connected, for example driveably connected and/or mechanically coupled, to the second output shaft. The reduction transmission can be in the form of a planetary transmission.

A torque can be introduced into the second output shaft by the first electric drive unit and can be transmitted from the second output shaft by the transmission, for example via the first output shaft, to the rear axle such that the rear axle can be driven from the first electric drive unit. In other words, the drivetrain is configured in such a manner that, for example in an operating state, the rear axle, and for example the front axle, is driveable or is driven by the first output shaft, and the first output shaft by the second output shaft, and the second output shaft by the first electric drive unit. Similarly, the drivetrain can be configured in such a manner that, for example in an operating state, the front axle is driveable or is driven by the first electric drive unit.

According to some embodiments, the rear axle is driveable by the first electric drive unit. As a result, the drivetrain, and for example the agricultural vehicle, can advantageously be driven via the front axle drive unit. Owing to the arrangement and/or connection of the first electric drive unit to the front axle drive unit, for example to the second output shaft, the drivetrain, and for example the agricultural vehicle, is advantageously structurally simple and has a compact construction. It is also of advantage that a conversion of the drivetrain, for example of the agricultural vehicle, from an internal combustion engine to a first electric drive unit, and/or the operation of the drive train, for example of the agricultural vehicle, is configured simply in terms of technical and/or economical aspects. The drivetrain, for example the agricultural vehicle, therefore advantageously also does not comprise an internal combustion engine.

In an embodiment of the disclosure, the drivetrain comprises a second electric drive unit and a power take-off drive shaft, the second electric drive unit being connected, for example driveably connected and/or mechanically coupleable, to the power take-off drive shaft. A torque can be introduced into the power take-off drive shaft by the second electric drive unit such that a power take-off shaft unit of the drivetrain can be driven. In other words, the drive train is configured in such a manner that, for example in an operating state, the power take-off drive shaft is driveable or is driven by the second electric drive unit. The power take-off drive shaft can be driveable by the second electric drive unit in a state in which the drivetrain is installed in the agricultural vehicle. The second electric drive unit can be a second electric motor which is suitable for example for driving the power take-off drive shaft and for example a propulsion movement of the agricultural vehicle. The second electric drive unit, for example the second electric motor, can be in the form of a synchronous and/or asynchronous motor and/or a reluctance motor and/or a DC motor. The energy storage unit can supply the first and/or the second electric drive unit with electrical energy. The second electric drive unit can therefore be operated with electrical energy from the energy storage unit. The power take-off drive shaft can be embodied as a solid shaft. The power take-off unit can be arranged along a longitudinal axis of the agricultural vehicle and behind the transmission in a driving direction of the agricultural vehicle. A power take-off housing can accommodate the components of the power take-off unit. The components of the power take-off unit can be the power take-off drive shaft and/or the power take-off stub and also the power take-off transmission. As a result, the power take-off drive shaft can advantageously be driven independently of the first electric drive unit. Owing to the arrangement and/or connection of the second electric drive unit to the power take-off drive shaft, the drivetrain, and for example the agricultural vehicle, is advantageously structurally simple and has a compact construction. In this way, a direct and therefore particularly energy-efficient transmission of driving power from the second electric drive unit to the power take-off unit of the tractor is possible.

In an embodiment of the disclosure, the power take-off drive shaft extends through the transmission, for example through a transmission input shaft in the form of a hollow shaft.

In an embodiment of the disclosure, the power take-off drive shaft is connected, for example driveably connected and/or mechanically coupled, to a pump drive shaft of a pump, A torque can be introduced into the power take-off drive shaft by the second electric drive unit and can be transmitted from the power take-off drive shaft to the pump drive shaft such that the power take-off unit and/or the pump can be driven. In other words, the drivetrain can be configured in such a manner that the pump drive shaft is connected to the power take-off drive shaft in order to drive the pump. The drivetrain can have working hydraulics which are operable by the second electric drive unit, and/or a fluid (e.g., hydraulic oil) is supplied for example by the second electric drive unit. For this purpose, the second electric drive unit drives the pump, for example hydraulic pump, which pumps the fluid into the working hydraulics. The pump which is driven by the second electric drive unit can be connected to a hydraulic tank from which the fluid is pumped into the working hydraulics by means of the pump. This arrangement achieves a compact construction of the drivetrain, and for example of the agricultural vehicle.

In an embodiment of the disclosure, the drivetrain comprises a third electric drive unit, and the third electric drive unit is connected, for example driveably connected and/or mechanically coupled, to a pump drive shaft of a pump. The pump drive shaft can be driven by the third electric drive unit. A torque can be introducible or transmittable into or to the pump drive shaft by the third electric drive unit. As a result, the pump can be driveable independently of the second electric drive unit. In other words, the drivetrain can be configured in such a manner that the pump drive shaft is connected to the third electric drive unit in order to drive the pump. The drivetrain can have working hydraulics which are operable by the third electric drive unit, and/or a fluid (e.g., hydraulic oil) is supplied for example by the third electric drive unit. For this purpose, the third electric drive unit drives the pump, for example hydraulic pump, which pumps the fluid into the working hydraulics. The pump which is driven by the third electric drive unit can be connected to the hydraulic tank from which the fluid is pumped into the working hydraulics by means of the pump. The energy storage unit can supply the first and/or the second and/or the third electric drive unit with electrical energy. This arrangement advantageously ensures that the pump is operable independently of the first and/or second electric drive unit.

According to some embodiments, the transmission is a range transmission, for example a single-stage transmission or a multi-stage transmission with at least two gears, or a continuously variable transmission. The transmission can be partially powershiftable or fully powershiftable. The transmission can comprise one or more layshafts.

In an embodiment of the disclosure, the first output shaft is connected, for example driveably connected and/or mechanically coupled, to the second output shaft via at least one transmission ratio unit. The drivetrain can comprise the transmission ratio unit. The transmission ratio unit can be in the form of a first gear set. In each case one toothed wheel of the first gear set can be arranged on the first and the second output shaft, for example can be rotationally fixedly or releasably rotationally fixedly connected to said output shafts. The two toothed wheels can mesh with one another. As a result, a torque can be transmittable from the second output shaft to the first output shaft by means of the first gear set. Similarly, the transmission ratio unit can comprise a first and a second gear set and a layshaft. In each case one toothed wheel of the first gear set can be arranged on the second output shaft and on the layshaft, for example can be rotationally fixedly or releasably rotationally fixedly connected thereto. In each case one toothed wheel of the second gear set can be arranged on the first output shaft and on the layshaft, for example can be rotationally fixedly or releasably rotationally fixedly connected thereto. The two toothed wheels of the respective gear set can mesh with one another. As a result, a torque can be transmittable from the second output shaft to the first output shaft by means of the transmission ratio unit.

The disclosure furthermore relates to an agricultural vehicle, for example a tractor or a towing vehicle or for example a construction machine, comprising a drivetrain. The agricultural vehicle according to the disclosure has the above-described advantages of the drivetrain according to the disclosure. The drivetrain is for driving the vehicle, for example for selectively driving the front axle and/or rear axle. Specifically, at least the rear axle is driveable via the front axle drive unit with a rotational movement and/or force and/or a torque of the first electric drive unit.

The disclosure furthermore relates to a method for operating a drivetrain for an agricultural vehicle, for example, wherein the drivetrain comprises a rear axle and a front axle, and a first electric drive unit and a transmission with a first output shaft. The first output shaft is connected here, for example driveably connected and/or mechanically coupled, to the rear axle. The drivetrain comprises a front axle drive unit which differs for example from the transmission. In addition, the front axle drive unit comprises a second output shaft, the first output shaft being connected, for example driveably connected and mechanically coupled, to the second output shaft. The first electric drive unit is connected, for example driveably connected and/or mechanically coupled, to the second output shaft. A torque is introduced into the second output shaft by the first electric drive unit and is transmitted from the second output shaft via the transmission, for example via the first output shaft, to the rear axle such that the rear axle is driven from the first electric drive unit. The method according to the disclosure has the above-described advantages of the drivetrain according to the disclosure.

The above and other features will become apparent from the following detailed description and accompanying drawings.

BRIEF DESCRIPTION OF THE DRAWINGS

The disclosure and further advantages and advantageous developments and refinements of the disclosure, in terms of the hardware and the method, will be explained in more detail below by means of exemplary embodiments and with reference to the drawings. Functionally equivalent or comparable components here are provided with the same reference signs. In the schematic drawings:

FIG. 1 shows a schematic illustration of a first exemplary embodiment of an agricultural or industrial utility vehicle according to the disclosure having a hydraulic arrangement according to the disclosure;

DETAILED DESCRIPTION

The embodiments or implementations disclosed in the above drawings and the following detailed description are not intended to be exhaustive or to limit the present disclosure to these embodiments or implementations.

Figure 1:
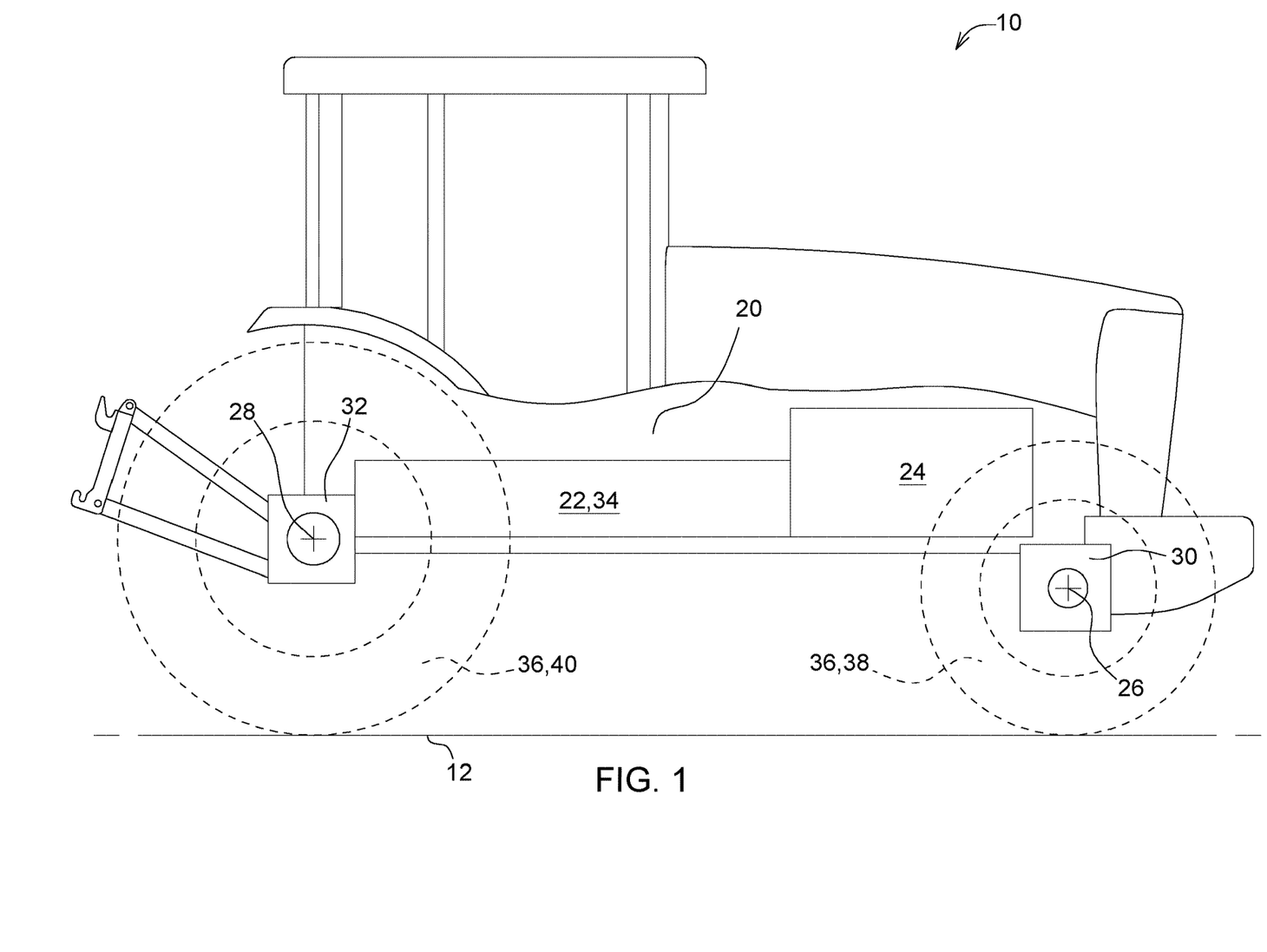
FIG. 1 shows a schematic illustration of a first exemplary embodiment of an agricultural vehicle according to the disclosure, with a first exemplary embodiment of a drivetrain according to the disclosure.

FIG. 1 shows a schematic illustration of a first exemplary embodiment of an agricultural vehicle 10 according to the disclosure, here for example of a tractor, with a first exemplary embodiment of a drivetrain 20 according to the disclosure. The agricultural vehicle 10 comprises the drivetrain 20. The drivetrain comprises a first electric drive unit 22, a transmission 24, a front axle 26 and a rear axle 28.

The transmission 24 can be a range transmission, for example a single-stage transmission or a multi-stage transmission, or a continuously variable transmission. The transmission can be partially powershiftable or fully powershiftable.

In addition, the drivetrain 20 comprises a front axle drive unit 34. The first electric drive unit 22 can be embodied as a first electric motor. In addition, the front axle 26 can be embodied as a steerable axle. The drivetrain 20 can also comprise a first differential 30, i.e., for example a front axle differential. The front axle 26 can be connected, for example driveably connected and/or mechanically coupled, to the first differential 30. The drivetrain 20 can also comprise a second differential 32, i.e., for example a rear axle differential. The rear axle 28 can be connected, for example driveably connected and/or mechanically coupled, to the second differential 32.

A rotational movement and/or a force and/or a torque can be introducible into the front axle drive unit 34 and transmittable from the front axle drive unit 34 to the transmission 24 and from the transmission 24 to the rear axle 28 by the first electric drive unit 22, and therefore the rear axle 28 can be driven by the first electric drive unit 22.

The rear axle 28 converts a rotational movement and/or force and/or a torque of the first electric drive unit 22 into a rotational movement and/or force and/or a torque of one or more ground engagement means 36, and thus into propulsion of the vehicle 10. The vehicle 10 can have one or more ground engagement means 36, here illustrated in the form of wheels 38, 40, which engage with an underlying surface 12 so as to transmit traction forces, and/or by way of which the vehicle 10 is supported on the underlying surface 12. The vehicle 10 can also have a chassis (not illustrated), wherein the chassis can for example be carried by the wheels 38, 40 suspended on the first and/or the second vehicle axle 28, 30. Specifically, a first pair of wheels 38 can be arranged on the front axle 26, and a second pair of wheels 40 on the rear axle 28. Alternatively, the ground engagement means 36 can also be in the form of and arranged as tracks and/or wheels 38, 40. The drivetrain 20, and/or for example the vehicle 10, can also comprise a power take-off unit 42.

Figure 2:
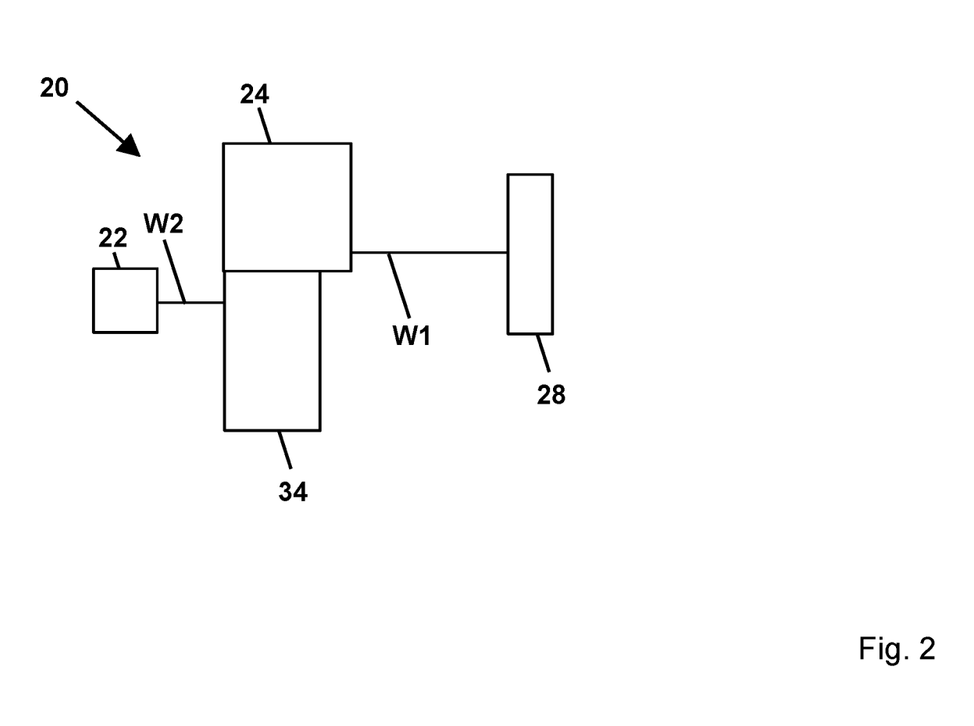
FIG. 2 shows a schematic illustration of the first exemplary embodiment of the drivetrain according to the disclosure.

FIG. 2 shows a schematic illustration of the first exemplary embodiment of the drivetrain 20 according to the disclosure. The drivetrain 20 shown in FIG. 2 corresponds substantially to the drivetrain 20 shown in FIG. 1, and therefore details and/or points of differentiation will be discussed below. The agricultural vehicle 10 can comprise the drivetrain 20, as is illustrated in FIG. 2. The transmission 24 comprises a first output shaft W1, the first output shaft W1 being connected, for example driveably connected and/or mechanically coupled, to the rear axle 28. In addition, the front axle drive unit 34 comprises a second output shaft W2. The first output shaft W1 is connected, for example driveably connected and/or mechanically coupled, to the second output shaft W2. The first electric drive unit 22 is connected, for example driveably connected and/or mechanically coupled, to the second output shaft W2. A torque can be introduced into the second output shaft W2 by the first electric drive unit 22 and can be transmitted from the second output shaft W2 by the transmission 24, for example by the first output shaft W1, to the rear axle 28 such that the rear axle 28 can be driven by the first electric drive unit 22.

Figure 3:
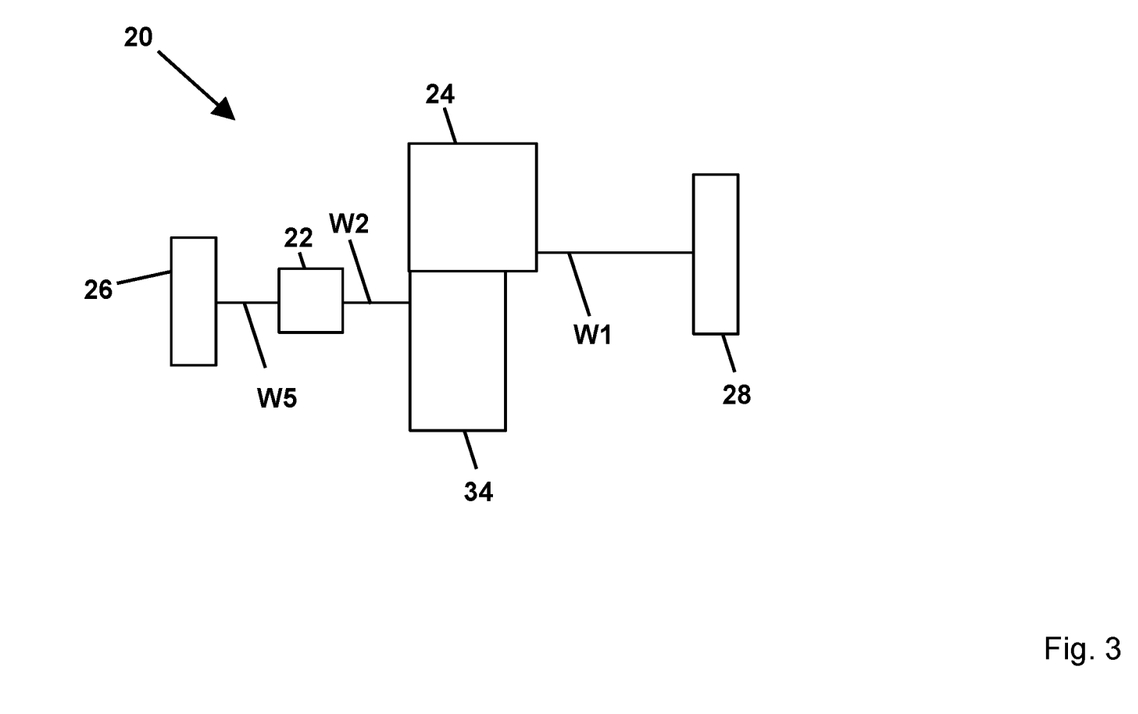
FIG. 3 shows a schematic illustration of a second exemplary embodiment of the drivetrain according to the disclosure.

FIG. 3 shows a schematic illustration of a second exemplary embodiment of the drivetrain 20 according to the disclosure. The drivetrain 20 shown in FIG. 3 corresponds substantially to the drivetrain 20 shown in FIGS. 1 and 2, and therefore details and/or points of differentiation will be discussed below. The agricultural vehicle 10 can comprise the drivetrain 20, as illustrated in FIG. 3. The front axle 26 is connected, for example driveably connected and/or mechanically coupled, to the first electric drive unit 22, for example to a fourth output shaft W5 of the first electric drive unit 22. As a result, a rotational movement and/or a force and/or a torque can thereby be transmittable by the first electric drive unit 22 to the rear axle 28 and the front axle 26, and therefore the front axle and the rear axle 26, 28 are driveable by the first electric drive unit 22.

Figure 4:
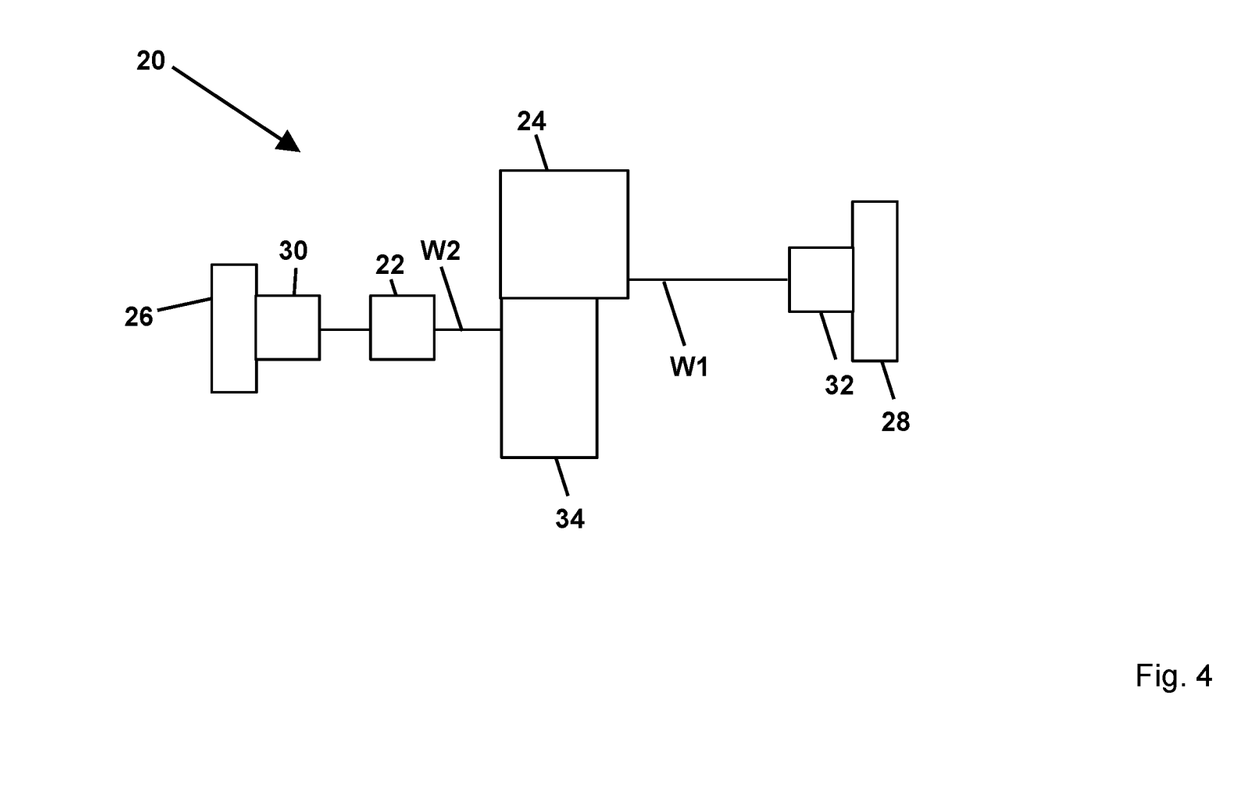
FIG. 4 shows a schematic illustration of a third exemplary embodiment of the drivetrain according to the disclosure.

FIG. 4 shows a schematic illustration of a third exemplary embodiment of the drivetrain 20 according to the disclosure. The drivetrain 20 shown in FIG. 4 corresponds substantially to the drivetrain 20 shown in FIGS. 1 to 3, and therefore details and/or points of differentiation will be discussed below. The agricultural vehicle 10 can comprise the drivetrain 20, as illustrated in FIG. 4. FIG. 4 shows a drive train 20 with the first differential 30, i.e., for example the front axle differential, and with the second differential 32, i.e., for example the rear axle differential. The front axle 26 is connected, for example driveably connected and/or mechanically coupled, to the first differential 30 and the rear axle 28 is connected, for example driveably connected and/or mechanically coupled, to the second differential 30.

Figure 5:
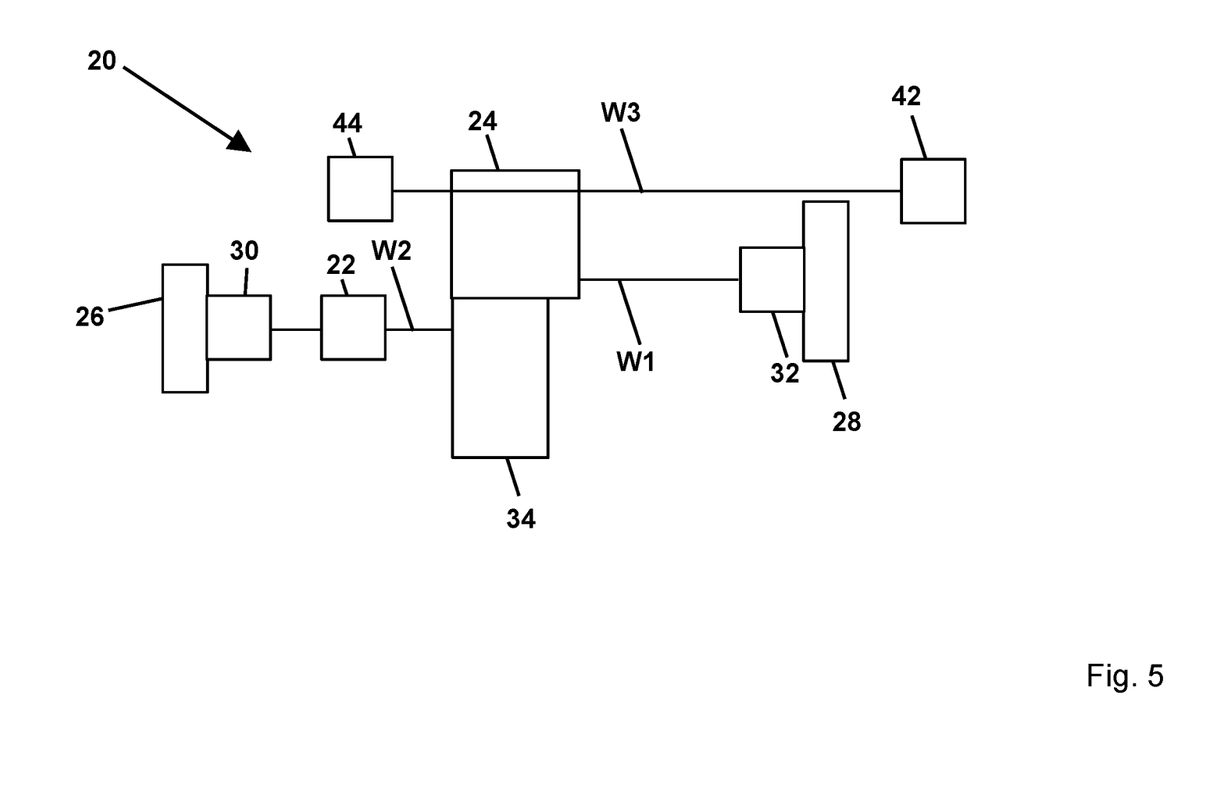
FIG. 5 shows a schematic illustration of a fourth exemplary embodiment of the drivetrain according to the disclosure.

FIG. 5 shows a schematic illustration of a fourth exemplary embodiment of the drivetrain 20 according to the disclosure. The drivetrain 20 shown in FIG. 5 corresponds substantially to the drivetrain 20 shown in FIGS. 1 to 4, and therefore details and/or points of differentiation will be discussed below. The agricultural vehicle 10 can comprise the drivetrain 20, as illustrated in FIG. 5. The drivetrain 20 comprises a second electric drive unit 44 and a power take-off drive shaft W3. The second electric drive unit 44 is connected, for example driveably connected and/or mechanically coupled, to the power take-off drive shaft W3. In addition, a rotational movement and/or a force and/or a torque can be introduced into the power take-off drive shaft W3 by the second electric drive unit 44 such that the power take-off unit 42 of the drivetrain 20 can be driven. The power take-off drive shaft W3 can extend through the transmission.

Figure 6:
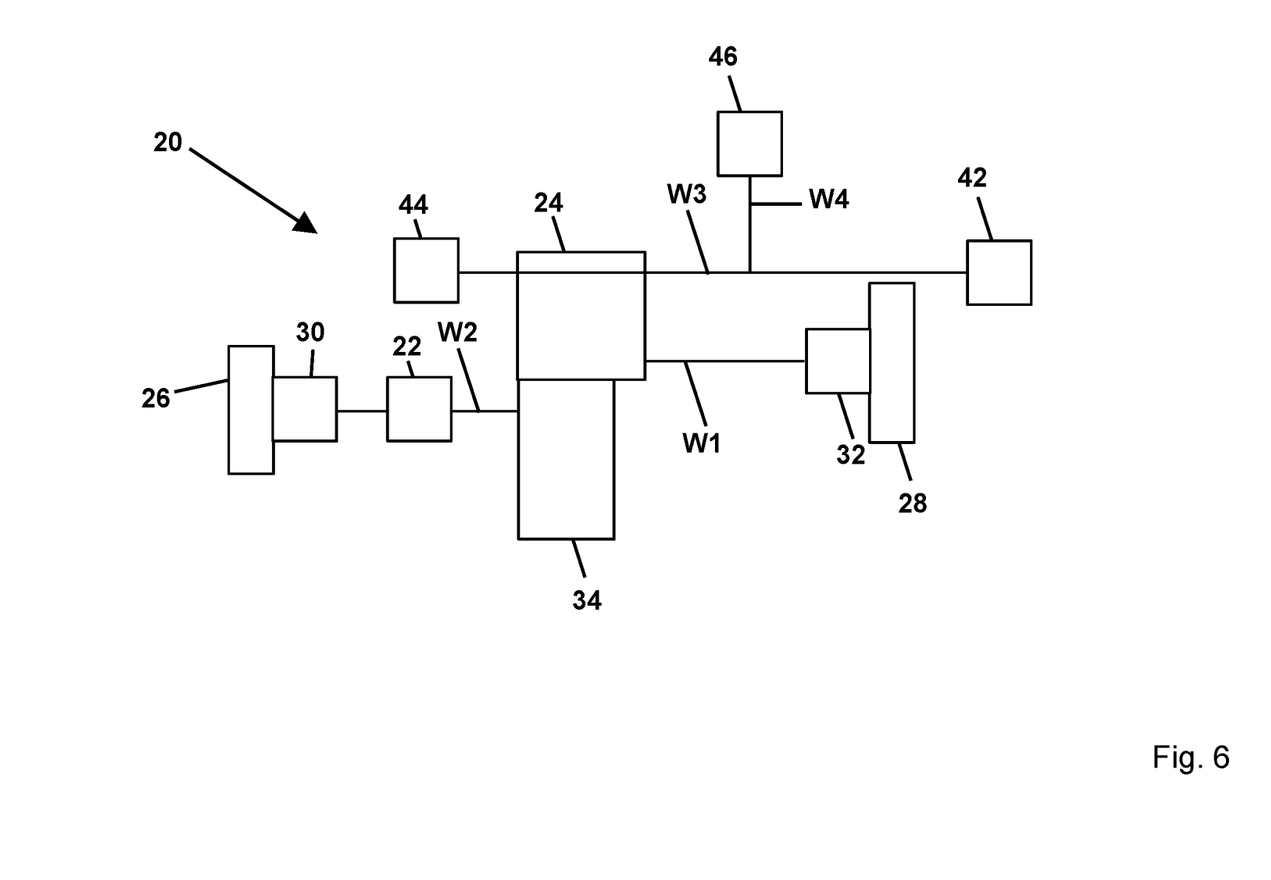
FIG. 6 shows a schematic illustration of a fifth exemplary embodiment of the drivetrain according to the disclosure.

FIG. 6 shows a schematic illustration of a fifth exemplary embodiment of the drivetrain 20 according to the disclosure. The drivetrain 20 shown in FIG. 6 corresponds substantially to the drivetrain 20 shown in FIGS. 1 to 5, and therefore details and/or points of differentiation will be discussed below. The agricultural vehicle 10 can comprise the drivetrain 20, as illustrated in FIG. 6. The power take-off drive shaft W3 is connected, for example driveably connected and/or mechanically coupled, to a pump drive shaft W4 of a pump 46, for example a hydraulic pump. A rotational movement and/or a force and/or a torque can therefore be introduced into the power take-off drive shaft W3 by the second electric drive unit 44 and can be transmitted to the pump drive shaft W4 such that the pump 46 can be driven. As a result, the power take-off unit 42 and the pump 46 can be driveable and/or operable by the second electric drive unit 44.

Figure 7:
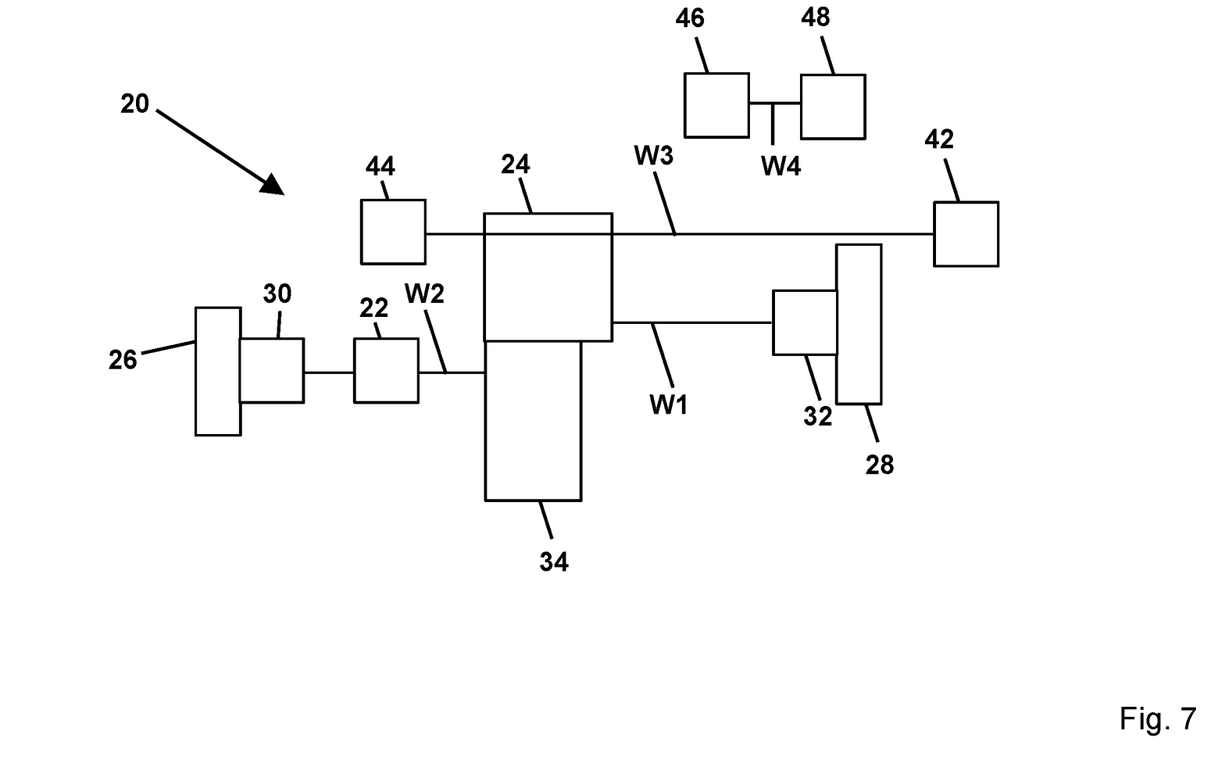
FIG. 7 shows a schematic illustration of a sixth exemplary embodiment of the drivetrain according to the disclosure.

FIG. 7 shows a schematic illustration of a sixth exemplary embodiment of the drivetrain 20 according to the disclosure. The drivetrain 20 shown in FIG. 7 corresponds substantially to the drivetrain 20 shown in FIGS. 1 to 6, and therefore details and/or points of differentiation will be discussed below. The agricultural vehicle 10 can comprise the drivetrain 20, as illustrated in FIG. 7. Similarly, however, the drivetrain 20 can also comprise a third electric drive unit 48. The third electric drive unit 48 is connected, for example driveably connected and/or mechanically coupled, to the pump drive shaft W4 of the pump 46. A rotational movement and/or a force and/or a torque can be introduced into the pump drive shaft W4 by the third electric drive unit 48 such that the pump 46 can be driven.

Figure 8:
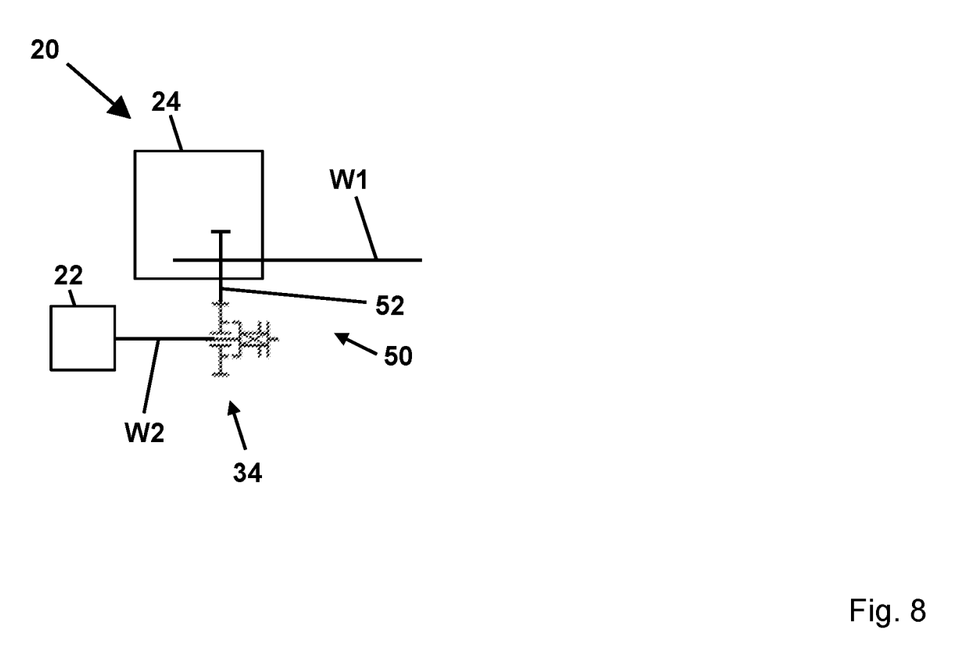
FIG. 8 shows a detailed schematic illustration of parts of the drivetrain according to the disclosure.

FIG. 8 shows a detailed schematic illustration of parts of the drivetrain 20 according to the disclosure. The drivetrain 20 shown in FIG. 8 corresponds substantially to the drivetrain 20 shown in FIGS. 1 to 7, and therefore details and/or points of differentiation will be discussed below. The agricultural vehicle 10 can comprise the drivetrain 20, as shown in FIG. 8. The drivetrain 20 comprises the transmission ratio unit 50. The first output shaft W1 is connected, for example driveably connected and/or mechanically coupled, to the second output shaft W2 via the transmission ratio unit 50. The transmission ratio unit 50 is in the form of a first gear set 52. In each case one toothed wheel of the first gear set 52 is arranged on the first and the second output shaft W1, W2, for example can be rotationally fixedly or releasably rotationally fixedly connected to said output shafts. As a result, a torque can be transmittable from the second output shaft W2 to the first output shaft W1 by means of the transmission ratio unit 50, for example the first gear set 52.

Figure 9:
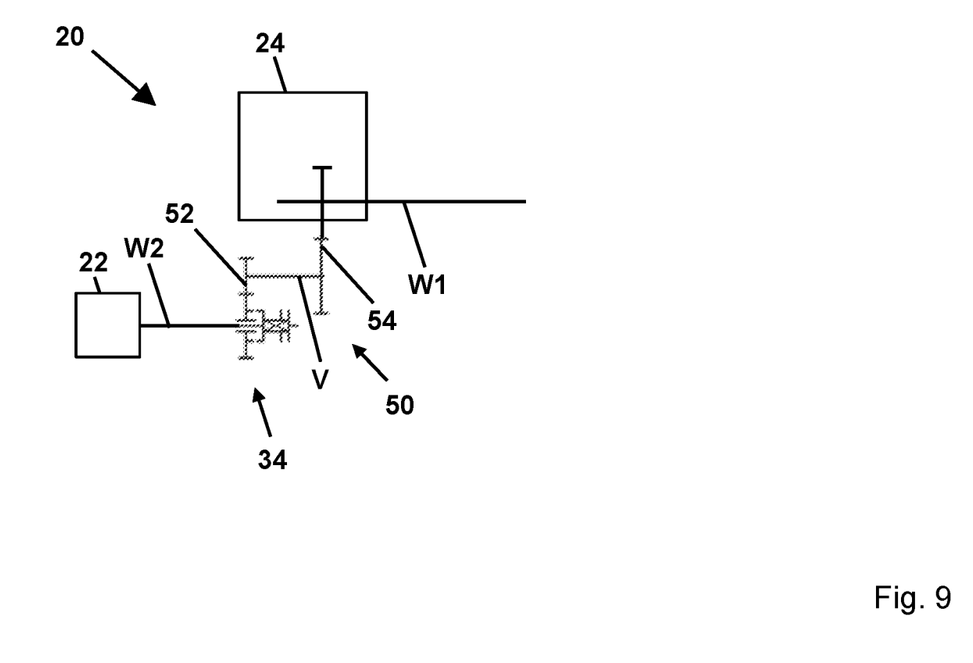
FIG. 9 shows a further detailed schematic illustration of parts of the drivetrain according to the disclosure.

FIG. 9 shows a detailed schematic illustration of parts of the drivetrain 20 according to the disclosure. The drivetrain 20 shown in FIG. 9 corresponds substantially to the drivetrain 20 shown in FIGS. 1 to 8, and therefore details and/or points of differentiation will be discussed below. The agricultural vehicle 10 can comprise the drivetrain 20, as shown in FIG. 9. The transmission ratio unit 50 comprises a first and second gear set 52, 54 and a layshaft V. In each case one toothed wheel of the first gear set 52 is arranged on the second output shaft W2 and on the layshaft V, for example is rotationally fixedly or releasably rotationally fixedly connected thereto. In each case one toothed wheel of the second gear set 54 is arranged on the first output shaft W1 and on the layshaft V, for example is rotationally fixedly or releasably rotationally fixedly connected thereto. As a result, a torque can be transmittable from the second output shaft W2 to the first output shaft W1 by the transmission ratio unit, for example the first and second gear set 52, 54 and the layshaft V.

The embodiments shown for the drivetrain 20 and the agricultural vehicle 10 have the advantage that the rear axle 28, especially also the front axle and the rear axle 26, 28, can be driven by the first electric drive unit 22 via the front axle drive unit 34, for example can be driven not via the transmission 24. The method according to the disclosure for operating a drivetrain 20 can be carried out with the embodiments shown for the drivetrain 20 and the agricultural vehicle 10.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A drivetrain for an agricultural vehicle, comprising:
   a rear axle and a front axle;
   a first electric drive unit; and
   a transmission with a first output shaft, the first output shaft being connected to the rear axle, and the drivetrain including a front axle drive unit, the front axle drive unit including a second output shaft, and the first output shaft being connected to the second output shaft;
   wherein the first electric drive unit is connected to the second output shaft, and a torque can be introduced into the second output shaft via the first electric drive unit and can be transmitted from the second output shaft via the transmission to the rear axle such that the rear axle can be driven by the first electric drive unit.

2. The drivetrain of claim 1, further comprising:
   a second electric drive unit and a power take-off drive shaft, the second electric drive unit being connected to the power take-off drive shaft, and a torque being able to be introduced into the power take-off drive shaft by the second electric drive unit such that a power take-off shaft unit of the drivetrain can be driven.

3. The drivetrain of claim 2, wherein the power take-off drive shaft extends through the transmission.

4. The drivetrain of claim 2, wherein the power take-off drive shaft is connected to a pump drive shaft of a pump, and a torque can be introduced into the power take-off drive shaft by the second electric drive unit and can be transmitted to the pump drive shaft such that the pump can be driven.

5. The drivetrain of claim 2, further comprising:
a third electric drive unit, and the third electric drive unit is connected to a pump drive shaft of a pump, and a torque can be introduced into the pump drive shaft by the third electric drive unit such that the pump can be driven.

6. The drivetrain of claim 1, wherein the transmission is a range transmission including one of a single-stage transmission, a multi-stage transmission, or a continuously variable transmission.

7. The drivetrain of claim 1, wherein the first output shaft is connected to the second output shaft via at least one transmission ratio unit.

8. An agricultural vehicle including a drivetrain, comprising:
a rear axle and a front axle;
a first electric drive unit; and
a transmission with a first output shaft, the first output shaft being connected to the rear axle, and the drivetrain including a front axle drive unit, the front axle drive unit including a second output shaft, and the first output shaft being connected to the second output shaft;
wherein the first electric drive unit is connected to the second output shaft, and a torque can be introduced into the second output shaft via the first electric drive unit and can be transmitted from the second output shaft via the transmission to the rear axle such that the rear axle can be driven by the first electric drive unit.

9. The agricultural vehicle of claim 8, further comprising:
a second electric drive unit and a power take-off drive shaft, the second electric drive unit being connected to the power take-off drive shaft, and a torque being able to be introduced into the power take-off drive shaft by the second electric drive unit such that a power take-off shaft unit of the drivetrain can be driven.

10. The agricultural vehicle of claim 9, wherein the power take-off drive shaft extends through the transmission.

11. The agricultural vehicle of claim 9, wherein the power take-off drive shaft is connected to a pump drive shaft of a pump, and a torque can be introduced into the power take-off drive shaft by the second electric drive unit and can be transmitted to the pump drive shaft such that the pump can be driven.

12. The agricultural vehicle of claim 9, further comprising:

a third electric drive unit, and the third electric drive unit is connected to a pump drive shaft of a pump, and a torque can be introduced into the pump drive shaft by the third electric drive unit such that the pump can be driven.

13. The agricultural vehicle of claim 8, wherein the transmission is a range transmission, for example a single-stage transmission or a multi-stage transmission, or a continuously variable transmission.

14. The agricultural vehicle of claim 8, wherein the first output shaft is connected to the second output shaft via at least one transmission ratio unit.

15. A method of operating a drivetrain for an agricultural vehicle, comprising:
connecting a first output shaft of a transmission to a rear axle;
connecting a second output shaft of a front axle drive unit to the first output shaft;
connecting a first electric drive unit to the second output shaft;
introducing a torque into the second output shaft via the first electric drive unit; and
transmitting torque from the second output shaft via the transmission to the rear axle such that the first electric drive unit drives the rear axle.

16. The method of claim 15, further comprising:
connecting a second electric drive unit to a power take-off shaft; and
introducing a torque into the power take-off shaft by the second electric drive unit.

17. The method of claim 16, further comprising:
connecting the power take-off shaft to a pump drive shaft of a pump; and
transmitting a torque from the power take-off shaft to the pump drive shaft.

18. The method of claim 16, further comprising:
connecting a third electric drive unit to a pump drive shaft of a pump; and
introducing a torque into the pump drive shaft by the third electric drive unit.

19. The method of claim 15, further comprising:
connecting the first output shaft to the second output shaft via at least one transmission ratio unit.

20. The drivetrain of claim 1, wherein the transmission is a range transmission including one of a single-stage transmission, a multi-stage transmission, or a continuously variable transmission.

* * * * *